(12) United States Patent
Eto

(10) Patent No.: US 7,427,354 B2
(45) Date of Patent: Sep. 23, 2008

(54) DEGRADATION TREATMENT PROCESS AND SYSTEM FOR ORGANICS IN ORGANICALLY-POLLUTED WATER

(75) Inventor: Shunji Eto, Hachioji (JP)

(73) Assignee: Aquatech, Ltd., Tokyo (JP)

( * ) Notice: Subject to any disclaimer, the term of this patent is extended or adjusted under 35 U.S.C. 154(b) by 263 days.

(21) Appl. No.: 11/334,502

(22) Filed: Jan. 19, 2006

(65) Prior Publication Data
US 2006/0163156 A1 Jul. 27, 2006

(30) Foreign Application Priority Data
Jan. 26, 2005 (JP) .............................. 2005-018917

(51) Int. Cl.
*C02F 3/30* (2006.01)
(52) U.S. Cl. .................... 210/259; 210/221.2
(58) Field of Classification Search ................ 210/259, 210/220, 221.1, 221.2, 260; 71/10; 435/283.1
See application file for complete search history.

(56) References Cited

U.S. PATENT DOCUMENTS

| | | | |
|---|---|---|---|
| 3,234,123 A | 2/1966 | Hinde | |
| 3,994,802 A | 11/1976 | Casey et al. | |
| 4,279,753 A * | 7/1981 | Nielson et al. | 210/605 |
| 4,786,413 A * | 11/1988 | Reimann et al. | 210/616 |
| 5,171,438 A * | 12/1992 | Korcz | 210/167.22 |
| 5,266,200 A | 11/1993 | Reid | |
| 5,906,745 A * | 5/1999 | Eto | 210/601 |
| 2004/0206699 A1* | 10/2004 | Ho et al. | 210/605 |

FOREIGN PATENT DOCUMENTS

| | | |
|---|---|---|
| EP | 0 741 111 A2 | 11/1996 |
| JP | 8-17901 | 2/1996 |
| JP | 8-108191 | 4/1996 |
| JP | 8-332497 | 12/1996 |
| WO | WO 99/61378 | 12/1999 |

OTHER PUBLICATIONS

Search report of App. No. EP 06000960, completed Mar. 2006.

\* cited by examiner

*Primary Examiner*—Fred Prince
(74) *Attorney, Agent, or Firm*—Cermak Kenealy & Vaidya LLP

(57) ABSTRACT

A system for the degradation treatment of organics in organically-polluted water is provided with a treatment tank for receiving, as the organically-polluted water, sewage or wastewater from a food-related factory. The treatment tank includes an inlet, an outlet arranged at a position upper than a vertical position of the inlet, and at least one, preferably plural air diffuser pipes for intermittently feeding oxygen-containing gas into the organically-polluted water in the treatment tank. The air diffuser pipe(s) are arranged at a position lower than the vertical position of the inlet such that an aerobic zone and an anaerobic zone can be formed in an upper part and a lower part of the treatment tank to effect degradation of soluble organics in the organically-polluted water primarily with aerobic bacteria and to effect degradation of solid organics in the organically-polluted water primarily with anaerobic bacteria, respectively. On a side lower than the vertical position of the air diffuser pipe(s) as first air diffuser pipe(s), at least one, preferably plural second air diffuser pipe can be desirably arranged to intermittently feed oxygen-containing gas into the organically-polluted water in the treatment tank such that the organically-polluted water can be agitated as a whole. A process is also disclosed for the degradation treatment of organics in organically-polluted water.

8 Claims, 6 Drawing Sheets

DEGRADATION TREATMENT PROCESS AND SYSTEM FOR ORGANICS IN ORGANICALLY-POLLUTED WATER

FIELD OF THE INVENTION

This invention relates to purification treatment of sewage or wastewater from a food-related factory (hereinafter called simply "organically-polluted water"), which comprises organics as a principal pollutant, specifically contains soluble organics and solid organics at high concentrations, and in particular, is concerned with a process and system for the degradation treatment of organics in the organically-polluted water, which can degrade and treat a majority of the organics in the organically-polluted water.

DESCRIPTION OF THE BACKGROUND

For the treatment of organically-polluted water containing soluble organics as primary pollutants, a variety of biological treatment processes are known to artificially and efficiently perform self-purification which takes place in the natural world. Such biological treatment processes have found widespread utility for their relatively economical treatment cost, and especially, the activated sludge process making use of aerobic bacteria is practiced in many fields.

As the mechanism of purification treatment in the above-mentioned activated sludge process, soluble organic pollutants indicated by "BOD" are promptly degraded by bacteria (aerobic bacteria), the resulting, proliferated bacteria are subjected to predation by protozoa, solid organics are put together with the thus-proliferated protozoa as an adhesive to form large flocs, and then, the flocs are subjected to solid-liquid separation in a settling tank so that organically-polluted water is purified to obtain treated water. In the activated sludge process, the living activities of aerobic bacteria and protozoa, therefore, have to be performed under good conditions. The flow through a treatment tank (aeration tank) is, therefore, controlled uniform such that the treatment tank always remains under constant aerobic conditions.

As described above, the activated sludge process can subject soluble organics in organically-polluted water to biodegradation an aeration tank, but no degradation of solid organics takes place so that the solid organics are subjected to solid-liquid separation in a settling tank arranged down stream of the aeration tank. In other words, biodegradation is not the entirety of the purification treatment by the activated sludge process, and as a matter of fact, its essence is to achieve the solid-liquid separation of suspended materials (SS; the abbreviation "SS" as used herein stands for "solid organics") from organically-polluted water.

Because the activated sludge process can be considered to have as its essential object the removal of organics from organically-polluted water by solid-liquid separation as mentioned above, a great deal of sludge is naturally produced through the solid-liquid separation. In the activated sludge process, therefore, a fraction of the activated sludge after the solid-liquid separation is returned as much as needed for the subsequent purification treatment of organically-polluted water as recycled sludge to the aeration tank, and is used in the subsequent biological treatment. The remaining activated sludge is eliminated as surplus sludge. The treatment and disposal of huge surplus sludge, therefore, still remains as a serious problem in the activated sludge process.

With a view to overcoming the above-described problem, a variety of attempts have been made in efforts to efficiently treat surplus sludge or to reduce the amount of surplus sludge to be produced. No treatment method is, however, known to eliminate surplus sludge (in other words, to reduce the production of surplus sludge to zero) and moreover, to be free from any problem of secondary pollution by the use of a chemical or the like while enjoying an economical advantage. Especially in recent years where the protection of the global environment has been strongly urged, this problem of surplus sludge treatment is serious, leading to a keen desire for the development of a process of the purification treatment of organically-polluted water without such a problem.

In addition to the above-described problem of surplus sludge treatment, the activated sludge process is accompanied by another problem as will be described next. As the BOD pollutant load that can be treated in an aeration tank by the activated sludge process is limited, the treatment of organically-polluted water is conducted by aerating the aeration tank to always maintain it under constant aerobic conditions and controlling the residence time of the organically-polluted water such that the concentration of soluble organic pollutants in organically-polluted water within the aeration tank as expressed in terms of "BOD" drops to a preferred range. The treatment of organically-polluted water containing soluble organics at high concentration, therefore, requires to scale up the treatment facilities.

In the case of water organically polluted at high concentration, the organically-polluted water which is flowing in under goes substantial fluctuations in BOD and SS concentration, thereby making it difficult to control the interior of the aeration tank under such conditions that its purification treatment can be performed always well. The activated sludge treatment of water organically polluted at high concentration, therefore, requires to arrange an adjustment tank in an upstream stage. As has been described above, it is difficult for the conventional activated sludge process to efficiently treat water organically polluted at high concentration such as sewage or wastewater from a food-related factory, which contains organics as primary pollutants, specifically contains soluble organics and solid organics at high concentrations (for example, which has 100 mg/L or higher BOD and 100 mg/L or higher SS).

In addition to the activated sludge process, the catalytic oxidation process is also known. Compared with the activated sludge process, however, this catalytic oxidation process is adopted to extremely limited extent only, and is used merely as a final finishing step in the activated sludge process or as a pretreatment step at waterworks. At the beginning, the tricking filter process, a catalytic oxidation process, was used. This process certainly makes it possible to reduce the production of sludge by 10 to 20% or so in comparison with the activated sludge process, and therefore, is not free from the production of sludge. It also involves other problems such as the production of an offensive odor and the growth of filter flies, and accordingly, it is scarcely performed these days. As its replacements, catalytic oxidation processes making use of rotary disks, honeycomb tubes or various other plastic materials have been also proposed. They are also practiced to limited extents only.

Recently, an attempt has been made to improve the efficiency of treatment by adding a carrier into an activated sludge tank to make partial use of catalytic oxidation in combination. Even in such a case, however, the production of sludge can be reduced by as little as 5 to 20% or so in comparison with the standard activated sludge process.

As equipment for decreasing the amount of surplus sludge produced by the activated sludge process, it is practiced to arrange a digestion tank. This digestion tank is a piece of equipment that heats sludge at 37° C. under anaerobic conditions and allows the sludge to stay there for 30 days. Even with this equipment, however, the decrease in the amount of the charged sludge is around 40% or so at the maximum.

According to the activated sludge process which is almost exclusively used in the current treatment of organically-polluted water, the aeration tank is maintained under constant aerobic conditions while the digestion tank is kept under constant anaerobic conditions, as mentioned above. Therefore, the degradation of sludge (solid organics) is 5% or so at the maximum in the former and is 40% or so at the maximum even in the latter.

The present inventor proposed a separation material for the purification of polluted water (see JP-B-08-017901). Under the current circumstances of the biological treatment of organically-polluted water as described above, the separation material enables totally novel purification treatment of organically-polluted water by making positive use of self-purification which takes place in the natural world. The separation material is formed of aggregate, which in turn comprises a plurality of crushed stones of 1 to 3 cm in average diameter. As techniques making use of the aggregate (aggregative purifying material), the present inventor also proposed a purification process for more efficiently performing purification of organically-polluted water (see JP-A-08-332497) and a purification process of polluted water by the use of an aggregative purifying material composed of hollow members having numerous openings in their surfaces (see JP-A-08-108191) . According to these techniques, the separation of a solid suspended in polluted water can be effectively performed, and the purification of still finer solid pollutants or the like can be conducted by causing organically-polluted water to pass through a purification zone in which an aggregative purifying material such as that described above is packed and arranged in stacked plural layers.

SUMMARY OF THE INVENTION

Objects of the present invention are, therefore, to provide a process and system for the treatment of high-concentration organic wastewater, which introduces sewage or wastewater from a food-related factory, said sewage or wastewater being hardly treated by the conventional activated sludge process and containing soluble organics and solid organics at high concentrations, as the high-concentration organic wastewater, can the high-concentration organic wastewater as is (i.e., in the form of the influent), can biologically degrade all the organics in the high-concentration organic wastewater, including the solid organics, and especially, does not develop the problem of surplus sludge treatment as the drawback of the activated sludge process.

The above-described objects can be achieved by the present invention as will be described hereinafter. In one aspect of the present invention, there is thus provided a process for the degradation treatment of organics in organically-polluted water, including introducing as the organically-polluted water sewage or wastewater from a food-related factory, said sewage or wastewater comprising the organics as a principal pollutant, and subjecting the organics in the organically-polluted water to degradation treatment in a purification zone, which comprises:

subjecting soluble organics in the organically-polluted water to degradation primarily with aerobic bacteria in an aerobic treatment zone formed in the purification zone;

subjecting solid organics in the organically-polluted water to degradation primarily with anaerobic bacteria in an anaerobic treatment zone formed in the purification zone;

subjecting the organics in the organically-polluted water to degradation primarily with facultive bacteria in a transition zone formed at a boundary between the aerobic treatment zone and the anaerobic treatment zone through both of which the organically-polluted water flows; and repeating a combination of the degradations in the aerobic treatment zone, anaerobic treatment zone and transition zone a plurality of times, with a proviso that a first treatment and a last treatment in the purification zone are each an aerobic treatment.

As a preferred embodiment of the above-described process, the combination can be repeated as many as from 3 to 20 times, preferably from 3 to 10 times, more preferably from 3 to 5 times. As another preferred embodiment, the combination can be repeated sequentially and linearly along an influent line of the organically-polluted water.

In another aspect of the present invention, there is also provided a system for the degradation treatment of organics in organically-polluted water, said system being provided with a treatment tank for receiving, as the organically-polluted water, sewage or wastewater from a food-related factory, said sewage or wastewater comprising the organics as a principal pollutant, to subject the organics in the organically-polluted water to degradation treatment in the treatment tank, wherein the treatment tank comprises:

an inlet for introducing the organically-polluted water into the treatment tank, an outlet for discharging treated water from the treatment tank, a purification zone arranged between the inlet and the outlet to purify the organically-polluted water while allowing the organically-polluted water to flow there through, and a plurality of perforated walls composed of plates, each of which defines a number of through-holes formed therein, and arranged with intervals there between in the purification zone to divide the purification zone into plural cells;

the perforated walls are arranged across the flow of the organically-polluted water such that aerobic cells, into which oxygen-containing gas is fed to effect degradation of soluble organics in the organically-polluted water primarily with aerobic bacteria, and anaerobic cells, in which degradation of solid organics in the organically-polluted water is effected primarily with anaerobic bacteria without feeding oxygen-containing gas, are located adjacent to each other in combinations with the perforated walls interposed there between, respectively, and upon operation of the system, transition zones in which degradation of the organics in the organically-polluted water is effected primarily with facultive bacteria are formed in vicinities of the perforated walls, respectively; and the inlet and the outlet are in communication with a most upstream one and a most downstream one of the aerobic cells, respectively.

As a preferred embodiment of the above-described system, the perforated walls can be arranged as many as sufficient to repeat a combination of the degradation with the aerobic bacteria, the degradation with the anaerobic bacteria and the degradation with the facultive bacteria as many as from 3 to 20 times. As another preferred embodiment, the aerobic cells, the transition zones and the anaerobic cells can be arranged in combinations linearly along an influent line of the organically-polluted water. As a further preferred embodiment, the perforated walls can be arranged substantially in parallel with each other. As a still further embodiment, the anaerobic cells can be provided in bottom parts thereof with solids accumulation chambers, respectively, such that solids accumulated in each solids accumulation chamber can be introduced into the immediately downstream aerobic cell as viewed in the direction of an influent line of the organically-polluted water.

In a further aspect of the present invention, there is also provided a system for the degradation treatment of organics in organically-polluted water, said system being provided with a treatment tank for receiving, as the organically-polluted water, sewage or wastewater from a food-related factory, said sewage or wastewater comprising the organics as a principal pollutant, to subject the organics in the organically-polluted water to degradation treatment in the treatment tank, wherein the treatment tank comprises:

an inlet for introducing the organically-polluted water into the treatment tank;

an outlet arranged at a position upper than a vertical position of the inlet to discharge treated water from the treatment tank; and at least one air diffuser pipe for intermittently feeding oxygen-containing gas into the organically-polluted water in the treatment tank, said air diffuser pipe being arranged at a position lower than the vertical position of the inlet such that an aerobic zone and an anaerobic zone can be formed in an upper part and a lower part of the treatment tank to effect degradation of soluble organics in the organically-polluted water primarily with aerobic bacteria and to effect degradation of solid organics in the organically-polluted water primarily with anaerobic bacteria, respectively.

As a preferred embodiment of the above-described system, the system can further comprise a means for intermittently feeding the oxygen-containing gas into the organically-polluted water through the air diffuser pipe, and the means can be a control unit for performing, as a single cycle, continuous diffusion of oxygen-containing gas for from 5 to 60 minutes and subsequent stoppage of the diffusion for from 20 to 240 minutes and repeating the cycle from 3 to 10 times. As another preferred embodiment, on a side lower than the vertical position of the air diffuser pipe as a first air diffuser pipe, at least one second air diffuser pipe can be arranged to intermittently feed oxygen-containing gas into the organically-polluted water in the treatment tank such that the organically-polluted water in the treatment tank is agitated as a whole. As a further preferred embodiment, the system can further comprise a means for intermittently feeding oxygen-containing gas into the organically-polluted water through the second air diffuser pipe, and the means can be a control unit for repeating, while performing the diffusion of the oxygen-containing gas through the first air diffuser piper, diffusion of the oxygen-containing gas through the second air diffuser pipe from 5 to 20 times for from 5 to 60 minutes each time at a frequency of once per from 5 to 10 times of the diffusion of the oxygen-containing gas through the first air diffusion pipe. As a still further preferred embodiment, the system can comprise a plurality of treatment tanks as described above and connected together in series. As an even further preferred embodiment, the system can comprise a plurality of air diffuser pipes as defined above and arranged spacedly from each other at substantially the same height. As a yet further preferred embodiment, the system can comprise a plurality of first air diffuser pipes as defined above and arranged spacedly from each other at substantially the same height and a plurality of second air diffuser pipes as defined above and arranged spacedly from each other at substantially the same height.

The present invention can provide a novel process and system for the treatment of water organically polluted at high concentration such as sewage or wastewater from a food-related factory, said sewage or wastewater containing soluble organics and solid organics at high concentrations. The process and system according to the present invention can treat the organically-polluted water as is without needing any pretreatment or dilution and moreover without developing the problem of surplus sludge treatment which is a drawback of the activated sludge process. In addition, the process and system according to the present invention can degrade the solid organics in the organically-polluted water, to say nothing of the soluble organics in the organically-polluted water, and therefore, can almost completely convert into gas and water ($H_2O$) the organics in the organically-polluted water.

DETAILED DESCRIPTION OF THE INVENTION AND PREFERRED EMBODIMENTS

Figure 1A:
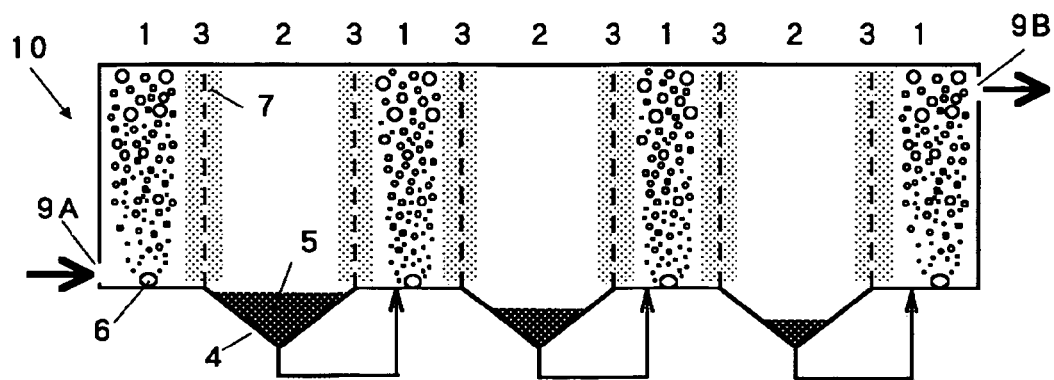
FIG. 1A is a schematic view of a treatment tank in a treatment system according to a first embodiment of the present invention and an operation of treatment of organically-polluted water by the treatment system.

The present invention will hereinafter be described in detail based on certain preferred embodiments thereof. With a view to resolving the above-described problems of the conventional art, the present inventors have proceeded with an investigation on the treatment of water organically polluted at high concentration and containing organics, such as soluble organics and solid organics, as a principal pollutant, e.g., sewage or wastewater from a food-related factory (which may hereinafter be called "polluted water") by using a purification zone packed with the above-described polluted-water-purifying separation material formed of an aggregate of plural crushed stones or with the above-described polluted-water-purifying members composed of hollow members having numerous openings in their surfaces. As a result, it was found that the formation of such a purification zone as having an aerobic zone, in which degradation is performed primarily by aerobic bacteria, an anaerobic zone, in which degradation is performed primarily by anaerobic bacteria, and a transition zone, which is formed between the aerobic treatment zone and the anaerobic zone to perform degradation primarily with facultive bacteria, such that the above-described three types of degradations can be repeated a plurality of times makes it possible to treat organically-polluted water such as sewage or wastewater from a food-related factory as is (i.e., in the form of the influent without using any aggregative purifying material), specifically to biologically degrade a large majority of organics in the polluted water with ease without production of sludge. The above-described finding has led to the present invention.

According to the above-described conventional techniques already proposed by the present inventor, organically-polluted water of a relatively low BOD value to be treated by the activated sludge process can be subjected to purification treatment without production of sludge by packing a treatment tank with an aggregative purifying material to form a purification zone and causing the organically-polluted water to flow through the purification zone. Such purification treatment is achieved by making skillful use of action, which is observed in the natural world and is called "flow-assisted separation" by the present inventors. It is, therefore, to be noted that the term "flow-assisted separation" as used herein means a solid-liquid separation phenomenon caused by differences in flow rate, which exist in any water system.

As a result of a detailed investigation by the present inventor, the purification without production of sludge in the above-described process can be considered to take place in accordance with a mechanism to be described next. When organically-polluted water is introduced into a purification zone packed with a great deal of an aggregative purifying material, a gentle flow is established in a single direction through the purification zone. However, this flow is not even throughout the purification zone, and in the cavities formed inside the aggregative purifying material which forms the purification zone, the flow is in a substantially stagnant state. In addition, stagnant parts also occur in spaces formed between the individual blocks or pieces of the aggregative purifying material. Owing to the flow-assisted separation phenomenon occurred as a result of such stagnation in flow, the SS in the organically-polluted water accumulates in the internal cavities of the aggregative purifying material and on surfaces of the blocks or pieces of the aggregative purifying material, said surfaces facing the spaces formed between the blocks or pieces of the aggregative purifying material. The SS in the organically-polluted water, which has accumulated within and on the aggregative purifying material, remains there under anaerobic conditions, and as a consequence, is degraded by an aerobic bacteria. This mechanism is considered to have made it possible to achieve the purification treatment of organically-polluted water without production of sludge.

The degradation treatment process according to the present invention for organics in organically-polluted water has been developed as a result of an extensive investigation on the application of the biodegradation, which is ingeniously performed on both of soluble organics and solid organics by making use of differences in flow rate as described above, to a wide variety of actual wastewater. It is an epoch-making purification process of organically-polluted water in that a great majority of organics in organically-polluted water can be degraded into water and gas without production of sludge by causing sewage or wastewater from a food-related factory, which comprises organics as a principal pollutant and contains soluble organics and solid organics at high concentrations, to continuously flow, as is, through the purification zone packed with no aggregative purifying material.

According to the investigation by the present inventor, a treatment system constituted to satisfy at least the following two basic requirements is indispensable for the biodegradation of a large majority of soluble organics and solid organics, which are contained at high concentrations in organically-polluted water, into gas and water.

(1) Aerobic conditions, anaerobic conditions and transition conditions consisting of aerobic conditions and anaerobic conditions in combination are created in a purification zone such that under these conditions, degradation is performed by aerobic bacteria, anaerobic bacteria and facultive bacteria, respectively. In addition, taking these three conditions of the aerobic conditions, anaerobic conditions and transition conditions as a combination, the treatment is performed such that the combination is repeated a plurality of times.

(2) In the organically-polluted water, the soluble organics and solid organics are contained as a liquid and a solid, respectively. The liquid is allowed to remain on the order of hours in the purification zone, while the solid is allowed to remain on the order of days in the purification zone.

Described specifically, the present invention firstly features to constitute a purification zone to form an aerobic treatment zone in which the degradation of soluble organics is performed by aerobic bacteria, an anaerobic treatment zone in which the degradation of solid organics is performed by anaerobic bacteria, and a transition zone in which the degradation of organics is performed by facultive bacteria while organically-polluted water flows to move from the aerobic treatment zone to the anaerobic treatment zone, and taking the above-described aerobic treatment zone, anaerobic treatment zone and transition zone as a combination, the present invention further features to repeat the combination of these three types of treatments a plurality of times. Since the biodegradation of the soluble organics primarily in the aerobic treatment zone can be readily performed, the liquid which makes up the organically-polluted water is controlled to remain on the order of hours in the purification zone. On the other hand, the biodegradation of the solid organics, which is primarily performed in the anaerobic treatment zone, is performed through a repetition of the degradation and liquefaction of a portion of the solid organics by anaerobic bacteria, the transfer of the liquefied organics into the next aerobic treatment zone and their degradation there, the liquefaction of a portion of the remaining solid organics in the next anaerobic treatment zone, and so on. As a consequence, the degradation of the solid organics is performed on the order of days. A description will hereinafter be made about the construction of a specific purification zone of the above-described constitution.

The aerobic treatment zone to be formed in the purification zone employed in the present invention can be readily formed in such a manner as feeding oxygen-containing gas from a lower part and allowing it to diffuse (aerate). The anaerobic treatment zone to be formed in the purification zone, on the other hand, can be formed with ease in such a manner as stopping the feeding of oxygen-containing gas and the aeration with oxygen-containing gas. As another method, the interior of the same treatment zone can be intermittently aerated to alternately form the aerobic treatment zone and the anaerobic treatment zone. Further, the transition region which is also needed in the process of the present invention can be formed in the purification zone by forming the aerobic treatment zone and the anaerobic treatment zone adjacent to each other in the above-described method and causing organically-polluted water to flow through these treatment zones. In the above-described method that the interior of the treatment zone is intermittently aerated, the termination of continuous aeration, which is effected to form the aerobic treatment zone, for a predetermined period makes it possible to create the transition zone until the subsequent formation of the anaerobic treatment zone.

According to the process of the present invention, it is possible to degrade a large majority of organics in sewage or wastewater from a food-related factory, said sewage or wastewater containing soluble organics and solid organics at high concentrations of 100 mg/L or higher, and hence to achieve its purification treatment without production of sludge. A description will next be made about the mechanism of the purification treatment. In the course of a detailed investigation on the mechanism of purification of polluted water in a purification zone packed with the above-described aggregative purifying material, the present inventor found that in the purification zone, there is a time lag between the flow behaviors of water and solids in organically-polluted water, and further that this time lag plays an extremely important role in the above-described purification treatment. Firstly, in the purification zone packed with the aggregative purifying material, solid organics accumulate and deposit inside the aggregative purifying material and also at the areas of contact between blocks or pieces of the aggregative purifying material. It is to be noted that, even when oxygen-containing gas is being fed by aeration into the purification zone packed with the aggregative purifying material, biological oxidation is not taking place by aerobic bacteria in all the interiors of and at all the surfaces of the aggregative purifying material existing in the purification zone and that, depending on the conditions under which the individual blocks or pieces of the aggregative purifying material are placed in the purification zone, not all the interiors and surfaces of the blocks or pieces of the aggregative purifying material are under conditions that permit active growth of aerobic bacteria and therefore, oxygen-deficient conditions arise, for example, between the air diffuser pipes and in areas where the growth of bacteria is very active. When such oxygen-deficient conditions arise in areas where solid organics have accumulated and deposited, their degradation by anaerobic bacteria takes place, and as a result, purification treatment is effected without production of sludge.

In the present invention, the above-described phenomenon is used to positively form a zone, where anaerobic degradation is to be conducted as described above, in combination with the aerobic treatment zone in the purification zone within the treatment tank, and sewage or wastewater from a food-related factory, said sewage or wastewater containing organics at high concentration, is caused to flow, as is, through the purification zone so that soluble organics and solid organics are both biodegraded into gas and water. It is considered that in the treatment process or system according to the present invention, the purification of organically-polluted water is conducted through such a mechanism as will be described hereinafter.

In the present invention, organically-polluted water is firstly introduced into an aerobic treatment zone, and via a transition zone, is then allowed to flow into an anaerobic treatment zone. Accordingly, the soluble organics in the organically-polluted water are firstly carried into the anaerobic treatment zone while being contained in the flow of the organically-polluted water. In the anaerobic treatment zone, the soluble organics are degraded by aerobic bacteria and hence, the aerobic bacteria grow. In other words, the soluble organics can be considered to change into aerobic bacteria in the aerobic treatment zone. The solid organics, on the other hand, undergo no changes while they are passing through the aerobic treatment zone and the transition region, and are slowly carried, as are, into the anaerobic treatment zone. As the organically-polluted water flows at a low speed in the anaerobic treatment zone where no aeration is performed, the solid organics are allowed to accumulate and deposit in a bottom part of the anaerobic treatment zone. As a result, anaerobic conditions are created in the vicinity of the thus-deposited solid organics, and the solid organics are liquefied by anaerobic bacteria at parts of surfaces thereof. The portions unliquefied in this stage remains as solid organics. On the other hand, the aerobic bacteria grown in the aerobic treatment zone die and undergo autolysis when they flow into the anaerobic treatment zone. The present invention is constituted to carry these liquefied organics into the aerobic treatment zone such that the soluble organics are degraded by aerobic bacterial in the aerobic treatment zone.

As described above, the solid organics accumulated and deposited in the bottom part of the anaerobic zone is not liquefied in its entirety in a short period. It is, therefore, necessary to repeat the above-described treatment a plurality of times. This repetition makes it possible to biodegrade all the solid organics in the organically-polluted water in to soluble organics. In other words, when treated as described above, the solid organics are converted by anaerobic bacteria into soluble organics, followed by their degradation by aerobic bacteria. A time on the order of days is, therefore, needed for the degradation of solid organics.

In the present invention, the feed rate of organically-polluted water into the treatment tank is controlled as desired depending on the concentration of SS in the organically-polluted water. Namely, in the case of organically-polluted water having a high SS concentration, the feed rate is reduced such that the residence time of the organically-polluted water in the treatment tank becomes longer. In the case of organically-polluted water having a low SS concentration, on the other hand, the feed rate is raised such that the residence time of the organically-polluted water in the treatment tank becomes shorter. Described specifically, when treating organically-polluted water the SS concentration of which is approximately from 100 to 250 mg/L like sewage, for example, its feed rate can desirably be controlled such that its residence time per unit volume falls within a range of from 10 to 20 hours. When treating organically-polluted water the SS concentration of which is as high as approximately from 300 to several thousands mg/L like wastewater from a food-related factory, its feed rate can desirably be controlled such that its residence time per unit volume falls within a range of from 20 hours to 5 days.

Figure 1B:
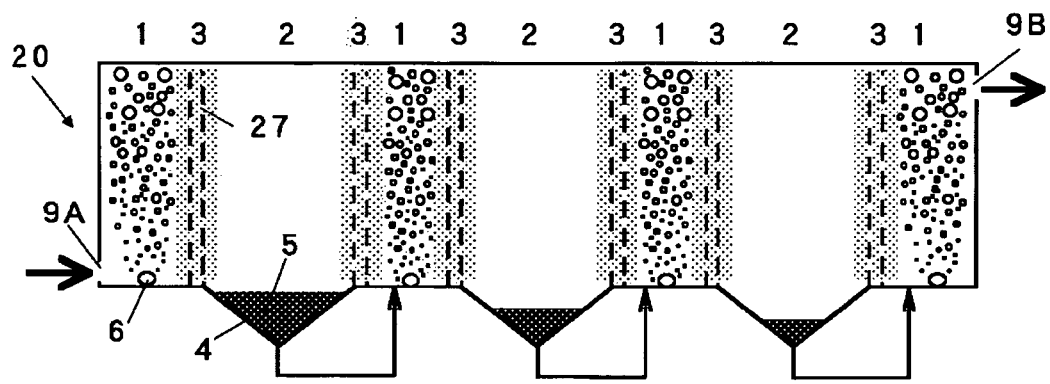
FIG. 1B is a schematic view of a treatment tank in a treatment system according to a modification of the first embodiment of the present invention and an operation of treatment of organically-polluted water by the modified treatment system.
Figure 2:
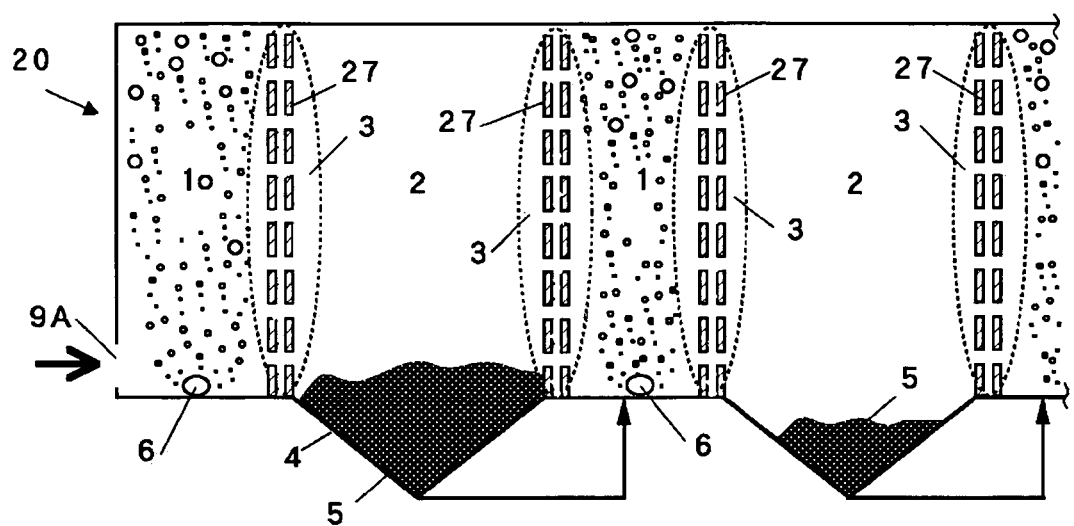
FIG. 2 is an enlarged, fragmentary, schematic view of the treatment tank of FIG. 1B.

In a system according to a first embodiment of the present invention, it is preferred, for example, to allow solid organics 5 to accumulate in pits (solids accumulation sections) 4 in anaerobic zones 2 so that the above-described degradations by the respective bacteria can be performed successfully (see FIG. 1A, FIG. 1B and FIG. 2). In a system according to a second embodiment of the present invention, on the other hand, solid organics 5 are allowed to accumulate below first air diffuser pipes 36A arranged in the vicinity of a middle stage of a treatment tank 30 (see FIG. 4B). The thus-deposited solid organics 5 are brought under anaerobic conditions after a predetermined time, so that a portion of the solid organics 5 is liquefied into soluble organics. In the case of the system depicted in FIG. 1A or its modified system illustrated in FIG. 1B (its enlarged, fragmentary, schematic view is shown in FIG. 2), the solid organics 5 accumulated in each pit 4 are intermittently sucked by a pump or an airlift, and are then transferred into a next aerobic treatment zone 1 such that the dissolved organics are degraded by aerobic bacteria in the next aerobic treatment zone 1.

Figure 4A:
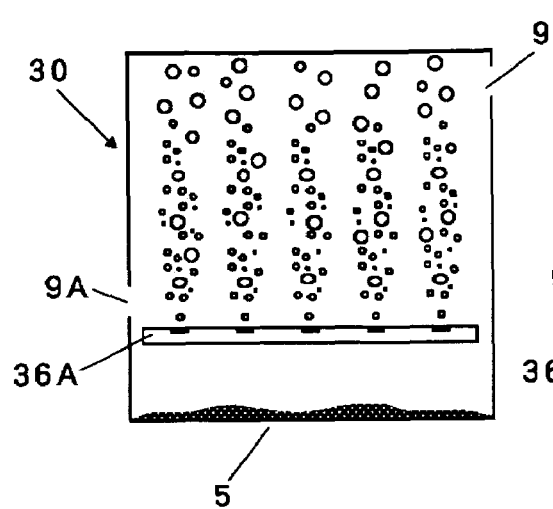
FIG. 4A is a schematic view of a treatment tank in a treatment system according to a second embodiment of the present invention and an operation of aerobic treatment of organically-polluted water by the treatment system of the second embodiment.
Figure 4B:
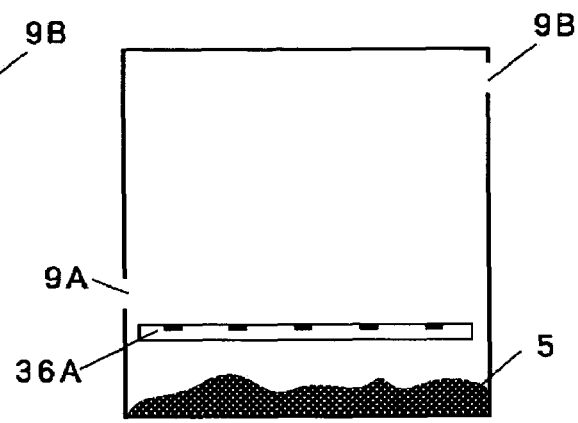
FIG. 4B is a similar schematic diagram as in FIG. 4A, but illustrates an operation of anaerobic treatment of organically-polluted water by the treatment system of the second embodiment.
Figure 5A:
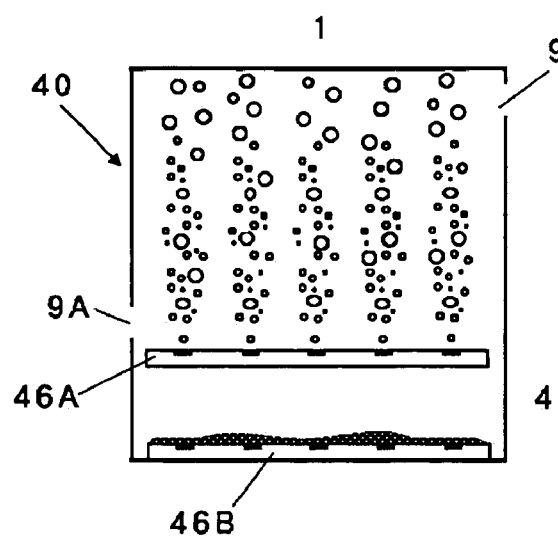
FIG. 5A is a schematic view of a treatment tank in a treatment system according to a preferred modification of the second embodiment of the present invention and an operation of aerobic treatment of organically-polluted water by the modified treatment system.
Figure 5B:
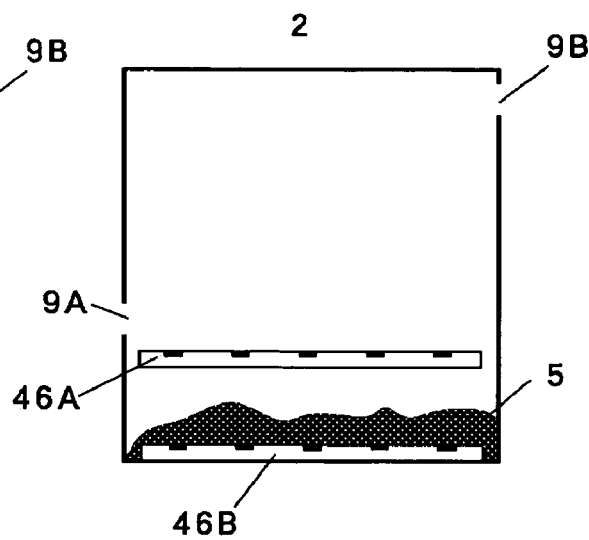
FIG. 5B is a similar schematic diagram as in FIG. 5A, but illustrates an operation of anaerobic treatment of organically-polluted water by the treatment system according to the preferred modification.
Figure 5C:
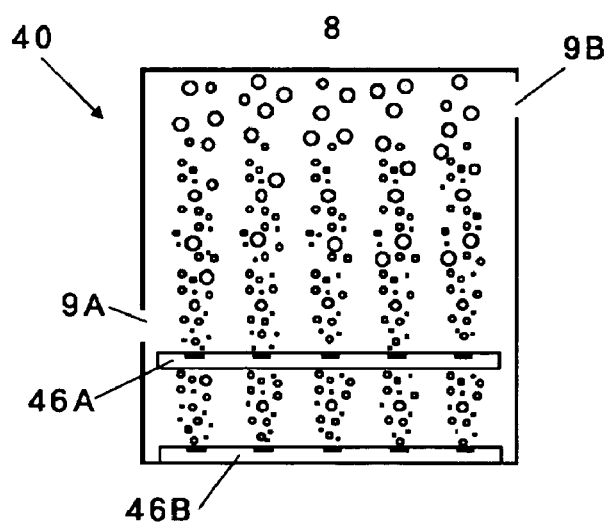
FIG. 5C is a similar schematic diagram as FIG. 5A, and illustrates an agitating operation of the organically-polluted water in its entirety by the treatment system of the preferred modification.

In the case of the system shown in FIG. 4B, on the other hand, second air diffuser pipes 46B are arranged in the vicinity of a bottom wall of the treatment tank 30 in addition to first air diffuser pipes 36A (see FIGS. 5A to 5C). By conducting air diffusion (aeration) through the second air diffuser pipes 46B located in the lower stage, the accumulated solid organics 5 are blown up above the first diffuser pipes 46A in the upper stage to agitate the organically-polluted water in the tank (see FIG. 5C). In this manner, the liquefied organics are degraded by aerobic bacteria in an aerobic zone 1 formed over the first air diffuser pipes 46A in the upper stage. When the aeration through the second air diffuser pipes 46B in the lower stage is stopped, the solid organics 5 again accumulate below the first air diffuser pipes 46A in the upper stage (see FIG. 5B), and subsequent to a predetermined time, an anaerobic treatment zone 2 is created so that the liquefaction of a portion of the solid organics takes place. When such treatment is repeated a plurality of times, the solid organics in the polluted water are gradually reduced in size as they flow through the purification zone, and eventually, become gas and water. As a result, the soluble organics and solid organics contained at high concentrations in the polluted water are completely degraded. These embodiments will next be described in more detail.

First Embodiment

FIG. 1A is a schematic diagram of a treatment tank 10 in a treatment system according to a first embodiment of the present invention. Basically, a purification zone is constituted in the treatment tank 10 such that an aerobic treatment zone 1, a transition zone 3 and an anaerobic zone 2 are formed and, when a combination of these treatment zones is taken as a repetition unit (a single treatment cycle), the treatment cycle can be repeated a plurality of times. Reference is now had to FIG. 1A. In this embodiment, a plate having a plurality of through-holes there through is arranged as a perforated wall 7, and such plates are arranged at plural positions within the treatment tank such that they traverse, for example, cross at right angles to the flow of the polluted water. The interior of the treatment tank is, therefore, divided into plural cells. As a result, the treatment tank is constituted such that a plurality of such repetition units, each consisting of the aerobic treatment zone 1, the transition zone 3 and the anaerobic treatment zone 2, are arranged one after another on a straight line. The number of repetitions can be set to perform from 3 to 20 treatment cycles, although it also depends on the properties of polluted water. According to an investigation by the present inventor, good treatment can be performed, for example, even for sewage or the like with solid organics contained at high concentration, provided that the treatment is conducted in a treatment tank equipped with such repetition units as many as permitting from 3 to 10 cycles of the above-described combination of treatments in its purification zone. In this case, the concentration of SS in the organically-polluted water may be monitored to determine the feed rate of the organically-polluted water into the tank as desired depending on the monitored value of the SS concentration of the organically-polluted water.

The aerobic treatment zones 1 arranged in the above-described purification zone can each be easily created, for example, by laying one or more straight pipes at right angles to the direction of a flow of organically-polluted water in a bottom part of the treatment tank 10, forming holes through lower part(s) of the wall(s) of the straight pipe(s) to provide air diffuser pipe(s) 6, and feeding air through the air diffuser pipe(s) 6 to perform continuous aeration. As the manner of aeration in this operation, it is preferred to perform the aeration with the intensity thereof suppressed such that no solid organics are allowed to settle while avoiding separation of emulsified oil components. Specifically, air can be fed at a constant rate of approximately from 10 to 200 mL/m$^2$/min. In the present invention, the flow of the organically-polluted water within the treatment tank is caused primarily by aeration with oxygen-containing gas such as air. In the present invention, the feed rate of oxygen-containing gas into the treatment tank can, therefore, be kept always constant. Under this condition, the feed rate of the organically-polluted water into the treatment tank can be controlled to maintain the interior of the treatment tank under an optimal cleaning environment.

The anaerobic treatment zones 2 arranged in the purification zone, on the other hand, can each be readily created by simply performing no aeration without laying such air diffuser pipe or pipes. More specifically, the perforated walls 7 can be arranged at intervals of from 2 to 10 m, more preferably from 5 to 10 m to divide the interior of the treatment tank 10 into plural cells, and one or more air diffuser pipes 6 can then be laid in the bottom part of every other cell to feed air or the like into the treatment tank. When the treatment tank 10 is constructed as described above, it is possible to create the aerobic treatment zones (aerated cells) 1, into which oxygen-containing gas is fed sufficiently, and the anaerobic treatment zones (non-aerated cells) 2, into which no sufficient oxygen-containing gas is fed. Moreover, these two types of cells are arranged adjacent to each other with the perforated walls 7 interposed there between, and the polluted water is caused to flow through both types of cells. As a result, the transition zones (oxygen-deficient zones) 3 can be created in the vicinities of the perforated walls, respectively. In addition, the three types of conditions of an aerobic treatment zone (aerated cell) 1, a transition zone 3 and an anaerobic zone (non-aerated cell) 2 can be repeated. In this embodiment, it is also preferred to construct the treatment tank 10 such that the inlet 9A and the outlet 9B are both communicated directly to the aerobic treatment zones 1, respectively, as illustrated in FIGS. 1A and 1B.

In the first embodiment, the ratio of the length of each aerobic treatment zone 1 to that of its associated anaerobic treatment zone 2 in the treatment tank 10 as viewed in the direction of a flow of polluted water through the treatment tank 10 may be set preferably at from 1:1 to 1:5 or so. The present invention is, however, not limited to the above-described preferred range, and the ratio of the length of each aerobic treatment zone 1 to that of its associated anaerobic treatment zone 2 can be changed depending on the SS concentration, BOD concentration and COD concentration in the polluted water to be treated. As the present invention has as an objective the complete degradation of solid organics, it is preferred to change the ratio of the length of each aerobic treatment zone to that of its associated anaerobic treatment zone specifically depending on the SS concentration. For example, upon treatment of polluted water high in BOD concentration as an index of soluble organics and also in SS concentration, it is preferred to make the anaerobic treatment zones 2 longer in the purification zone. The ratio of the length of each aerobic treatment zone 1 to that of its associated anaerobic treatment zone 2 in the treatment tank 10 as viewed in the direction of the flow of the polluted water through the treatment tank 10 can be changed to a desired ratio by determining the position of the corresponding perforated wall 7 in the purification zone of the treatment tank 10 as needed.

Each perforated wall 7 arranged at right angle to the flow of the polluted water may be constituted of a single plate having a number of through-holes there through as illustrated in FIG. 1A. As in a modification shown in FIG. 1B, however, plural, more specifically two or three of such plates may be used in combination and may be arranged spacedly from each other and in parallel with each other. When a purification zone of a treatment tank 20 is divided by perforated walls 27 each of which is formed of plural plates as described above and the plural cells divided by the perforated walls 27 are alternately formed into such aerobic treatment zones 1 and anaerobic treatment zones 2 as described above, the aerobic treatment zones 1 can be divided more distinctly from their associated anaerobic treatment zones 2. Further, a transition zone 3 is created between or in the vicinity of the plural plates which makeup each perforated wall 27. It is, therefore, possible to perform more efficient treatment. In each transition zone 3, organics are biodegraded by facultive bacteria and are then caused to flow into the next aerobic treatment zone 1. When each transition zone is formed by using plural plates as in the above-described modification, the plates can be arranged at interval or intervals of from 10 to 50 cm or so.

In each of the first embodiment and its modification, the cells are arranged such that, as shown in FIG. 1A and 1B, the treatment is repeated from the side of introduction of polluted water in the order of aerobic (aerated) treatment, transition and anaerobic (non-aerated) treatments, aerobic (aerated) treatment, transition and anaerobic (non-aerated) treatments, and so on and the last treatment cell becomes an aerobic treatment zone. Preferably, the holes formed through the plate or plates which make up each perforated wall can be, for example, from 3 to 10 cm or so in diameter, and can be as many as giving a degree of openings of from 5 to 40% through the entire plate or plates.

When sewage or wastewater from a food-related factory is introduced into the treatment tank 10 or 20 constructed as described above, the settling of solid organics obviously takes place in each anaerobic treatment zone 2 where there is no flow. The solid organics so settled reside in the anaerobic treatment zone 2 for a longer time than water which freely flows through the perforated wall 7. During this residence, degradation by anaerobic bacteria is performed so that the liquefaction of the solid organics progresses. In each of the first embodiment and its modification, the treatment tank 10 or 20 is constructed such that as illustrated in FIG. 1A or 1B, each anaerobic treatment zone 2 is provided in a bottom part thereof with a pit (solids accumulation section) 4 and the solid organics 5 accumulated in the pit 4 is sucked at predetermined intervals by a stationary or movable suction pipe and is fed into the next aerobic treatment zone 1. The suction can be performed by a pump or an airlift, and can be conducted at intervals of from 1 to 5 days.

The mechanism of purification of polluted water in the above-described first embodiment will now be summarized. Through the purification zone in this first embodiment, the aerobic treatment zone 1, the transition treatment zone 3 and the anaerobic treatment zone 2 are repeated. When polluted water is introduced into the treatment tank 10, water with soluble organics contained therein resides for a time on the order of hours within the treatment zone while solid organics reside for a time on the order of days within the treatment zone. Accordingly, the degradation of aerobic bacteria and the degradations by facultive bacteria and anaerobic bacteria are efficiently performed in the purification zone, and moreover, these degradations are repeated. Even when polluted water containing solid organics at high concentration, such as sewage, is treated, solid organics are degraded into gas and water, to say nothing of soluble organics, and therefore, the organics in the polluted water are degraded substantially in their entirety (see FIG. 3).

Figure 3:
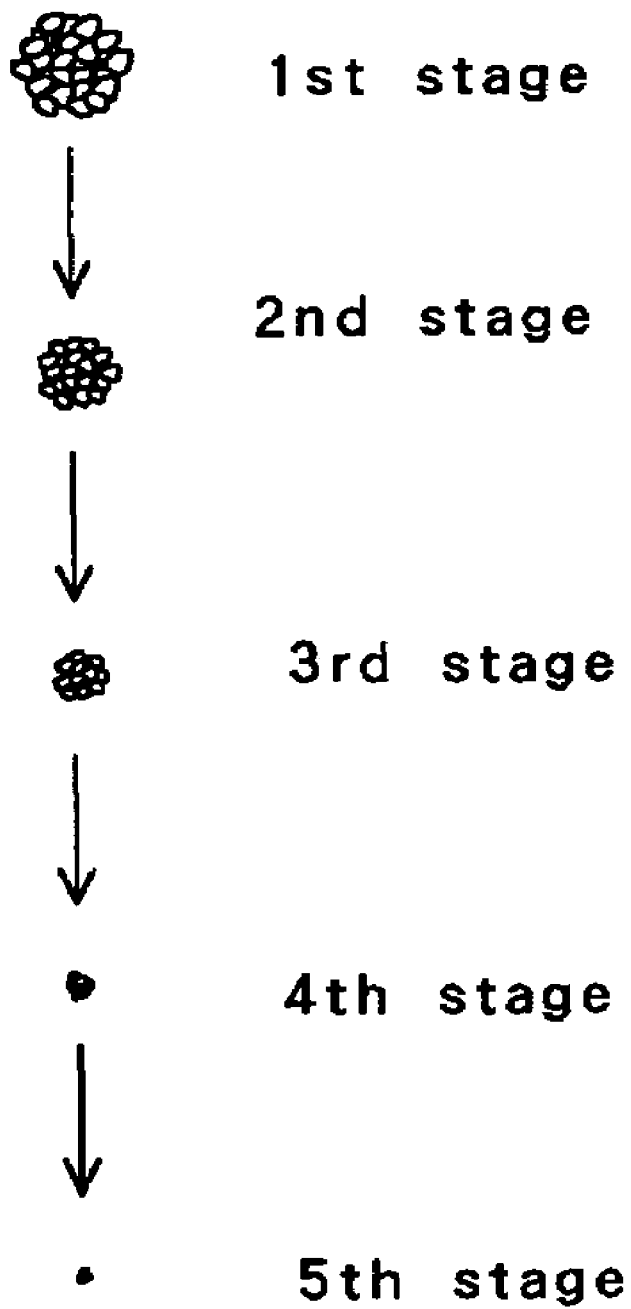
FIG. 3 is a schematic diagram for describing the progress of degradation of solid organics in the present invention.

In FIG. 3, how the solid organics in polluted water are degraded is illustrated by dividing the progress of the degradation in five stages (from the first stage to the fifth stage in the direction of arrows). As the first stage, there are shown the conditions of solid organics in an anaerobic treatment zone 2 arranged on an upstream side. In the anaerobic treatment zone 2, the cytoplasmic membranes of cells located on the surfaces of the solid organics are disrupted so that the cells are liquefied. As the second stage, there are shown the conditions of the solid organics in an aerobic treatment zone 1 arranged on a downstream side of the anaerobic treatment zone 2. In this aerobic treatment zone 1, the liquefied portions of the solid organics are washed off under the surrounding, flowing aerobic conditions so that the solid organics become smaller than their size in the anaerobic treatment zone 2 arranged on the upstream side. As the third stage, there are shown the conditions of the solid organics in another anaerobic treatment zone 2 arranged on a downstream side of the aerobic treatment zone 1. In this anaerobic treatment zone 2, the cytoplasmic membranes of cells located on the surfaces of the solid organics are disrupted so that the cells are liquefied. As the fourth stage, there are shown the conditions of the solid organics in another aerobic treatment zone 1 arranged on a further downstream side. In this aerobic treatment zone 1, the liquefied portions of the solid organics are washed off further by the surrounding, flowing, aerated water so that the solid organics become still smaller. As the fifth stage, there are shown the conditions of the solid organics in a further anaerobic treatment zone 2 arranged on a still further downstream side. In this anaerobic treatment zone 2, the cytoplasmic membranes of cells located on the surfaces of the solid organics are disrupted, so that the cells are liquefied and the solid organics become still smaller. When earth, sand, clay, silt or the like is contained in the polluted water, it is not degraded by the above-described process and system according to the present invention so that a need arises to remove it from the treatment system. The purification mechanism of polluted water in the modification is similar to the above-described purification mechanism of polluted water in the first embodiment, and therefore, its description is omitted herein.

Second Embodiment

FIGS. 4A and 4B are schematic diagrams showing a treatment system according to a second embodiment of the present invention and an operation of treatment by the system. As illustrated in these drawings, air diffuser pipes 36A are arranged to continuously feed oxygen-containing gas into organically-polluted water under treatment in a treatment tank 30 equipped with an inlet 9A for the organically-polluted water and an outlet 9B for the resulting treated water. The treatment tank 30 is characterized in that the air diffuser pipes 36A are arranged on a side lower than the vertical position of the inlet 9A to form an aerobic treatment zone in an upper part of the treatment tank 30 and an anaerobic treatment zone in a lower part of the treatment tank 30. In the aerobic treatment zone, the degradation of soluble organics in the organically-polluted water is performed primarily by aerobic bacteria. In the anaerobic treatment zone, on the other hand, the degradation of solid organics in the organically-polluted water is performed primarily by anaerobic bacteria. Described specifically, the air diffuser pipes 36 A are not arranged in the vicinity of a bottom wall of the treatment tank 30 but are arranged in the vicinity of a middle stage of the treatment tank 30 to form the anaerobic zone in the lower part of the treatment tank 30 (see FIGS. 4A and 4B). As a consequence, the inlet 9A is arranged above the vertical position of the air diffuser pipes 36A.

In the treatment system according to the second embodiment constructed as described above, oxygen-containing gas (e.g., air or the like) is continuously fed through the air diffuser pipes 36A into the treatment tank 30 such that the degradation of soluble organics in organically-polluted water is performed primarily by aerobic bacteria in the aerobic treatment zone formed in the upper part of the treatment tank 30, the degradation of solid organics in the organically-polluted water is performed primarily by anaerobic bacteria in the anaerobic treatment zone formed in the lower part of the treatment tank 30, and the degradation of organics is performed primarily by facultive bacteria in the transition zone formed owing to the above-described construction of the treatment tank 30 and the continuous diffusion of the oxygen-containing gas and composed in combination of such an aerobic treatment zone and anaerobic treatment zone. By allowing the treatments in these three types of treatment zones to proceed at predetermined speeds, respectively, the organically-polluted water can be degraded into gas and $H_2O$ practically without needing the removal of solid organics out of the treatment system. It is to be noted that as a specific method for allowing the treatments in the three types of treatment zones to progress at predetermined rates, the timing of the continuous feeding of oxygen-containing gas (air or the like) into the treatment tank 30 through the air diffuser pipes 36A, namely, the timing of aeration can be designed as desired. When organically-polluted water to be introduced into the treatment tank 30 contains solid organics at still higher concentration, for example, the suspension of the diffusion of oxygen-containing gas through the air diffuser pipes 36A as illustrated in FIG. 4B can be set longer to allow the degradation of the solid organics 5 to progress.

A preferred modification of the above-described second embodiment will next be described with reference to FIGS. 5A to 5C. In addition to the air diffuser pipes 36A in the second embodiment (hereinafter referred to as "the first air diffuser pipes 46A"), second air diffuser pipes 46B are arranged in the vicinity of a bottom wall of a treatment tank 40 at a height lower than the vertical position of the first air diffuser pipes 46A such that oxygen-containing gas can be intermittently fed into the organically-polluted water in the treatment tank 40 to agitate the organically-polluted water in its entirety in the treatment tank.

In the treatment system according to the preferred modification of the second embodiment constructed as described above, the degradation of soluble organics in the organically-polluted water is performed primarily with aerobic bacteria in an aerobic treatment zone formed in an upper part of the treatment tank 40 by using the first air diffuser pipes 46A and the second air diffuser pipes 46B, the degradation of solid organics in the organically-pollute water is performed primarily with anaerobic bacteria in an anaerobic treatment zone formed in a lower part of the treatment tank 40, and the degradation of organics in the organically-pollute water is performed primarily by facultive bacteria in a transition zone formed owing to the above-described construction of the treatment tank 40 and the intermittent diffusion of the oxygen-containing gas and composed in combination of such an aerobic treatment zone and anaerobic treatment zone. Taking the degradations in the three types of treatment zones as a combination, oxygen-containing gas is intermittently fed through the first air diffuser pipes 46A and the second air diffuser pipes 46B to agitate the organically-polluted water in its entirety in the treatment tank 40 such that the combination is repeated a plurality of times.

As a specific means for intermittently feeding the oxygen-containing gas through the first and second air diffuser pipes 46A, 46B into the organically-polluted water in the treatment tank 40 in the treatment system according to the preferred modification of the second embodiment, it is preferred to arrange a control unit (not shown) which can feed the oxygen-containing gas into the organically-polluted water at a specific timing. A specific example of the timing will be described hereinafter with reference to FIG. 6.

Figure 6:
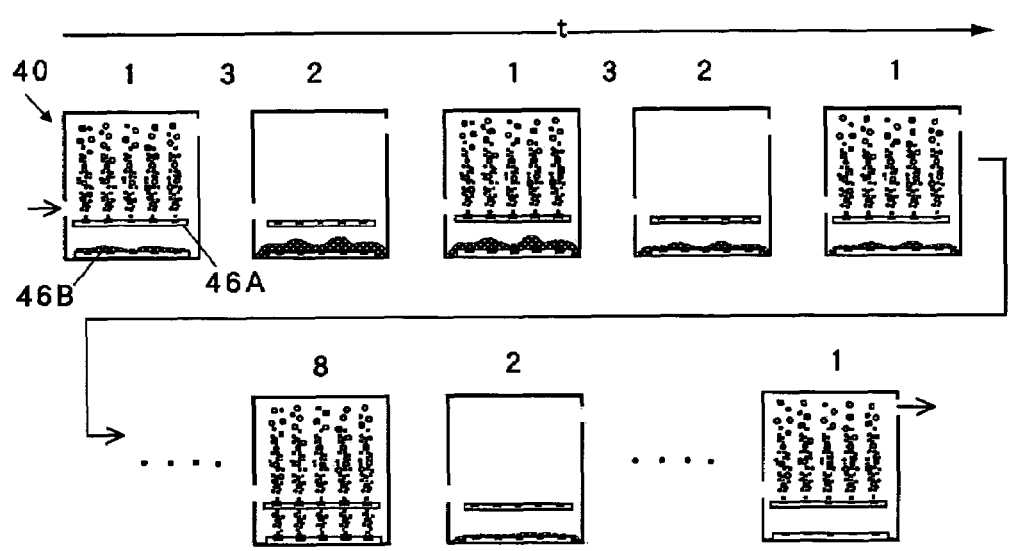
FIG. 6 is a schematic diagram of an operation of repeated treatment of organically-polluted water by the treatment system according to the preferred modification of the second embodiment.

FIG. 6 illustrates conditions within the single treatment tank 40 equipped with the first air diffuser pipes 46A and the second air diffuser pipes 46B arranged in two stages, that is, upper and lower stages, respectively, to feed oxygen-containing gas when treatment was conducted by using the treatment system according to the preferred embodiment of the second embodiment having the treatment tank 40. As time t went on in the direction of an arrow, the conditions inside the treatment tank 40 changed as shown in FIG. 6. FIG. 6 indicate the conditions inside the treatment tank 40 at various time points when the diffusion of oxygen-containing gas was intermittently conducted through the first air diffuser pipes 46A and the second air diffuser pipes 46B arranged in the two stages. Those conditions inside the treatment tank 40 will hereinafter be described one after another, starting from the conditions in the treatment tank shown at the leftmost position in the upper row.

The organically-polluted water introduced into the treatment tank 40 is placed under aerobic conditions that oxygen-containing gas (e.g., air or the like) is continuously diffused (aerated) through the first air diffuser pipes 46A located in the upper stage inside the treatment tank 40 (in other words, in an aerobic treatment zone 1), and therefore, the degradation treatment of soluble organics by aerobic bacteria proceeds firstly. During this degradation treatment, a large majority of solid organics is caused to suspend or settle in a zone, which is formed below the first air diffuser pipes 46A and is not subjected to the aeration. The degradation of the solid organics, therefore, proceeds by anaerobic bacteria and facultive bacteria in the vicinity of the bottom wall of the treatment tank 40. When the diffusion of oxygen-containing gas through the first air diffuser pipes 46A is then stopped, the interior of the treatment tank 40 is maintained for a while as the transition zone 3 in which aerobic zones and anaerobic zones are mixed together, and the organics in the organically-polluted water are subjected to degradation by facultive bacteria. Subsequently, the interior of the treatment tank 40 is maintained under oxygen-free anaerobic conditions (in other words, as an anaerobic treatment zone 2). As no diffusion of oxygen-containing gas is conducted under these conditions, the flow of the organically-polluted water in the treatment tank 40 gradually stops so that the solid organics in the organically-polluted water are caused to settle and deposit. The thus-settled solid organics are placed under anaerobic conditions, and therefore, the cytoplasmic membranes of cells on the surfaces of the solid organics are degraded and liquefied by anaerobic bacteria. According to an investigation by the present inventor, from 5 to 20% of the solid organics in the organically-polluted water are liquefied in the above-described case. Oxygen-containing gas is then caused to diffuse again through the first air diffuser pipes 46A located in the upper stage of the treatment tank 40 to place especially the upper part of the treatment tank 40 under aerobic conditions. As a result, a large majority of the solid organics liquefied under the anaerobic conditions in the treatment tank 40 is caused to flow and is degraded by aerobic bacteria.

The diffusion of oxygen-containing gas through the first air diffuser pipes 46A is then stopped again to place the treatment tank 40 under anaerobic conditions, and as described above, the degradation by facultive bacteria and the degradation by anaerobic bacteria are allowed to proceed. In the above-described treatment, oxygen-containing gas is caused to diffuse only through the first air diffuser pipes 46A in the upper stage and the diffusion of oxygen-containing gas through the second air diffuser pipes 46B is kept stopped. As there is substantially no flow between the first and second air diffuser pipes 46A and 46B arranged in the upper and lower, two stages, respectively, the solid organics in the organically-polluted water settle and deposit between the first air diffuser pipes 46A in the upper stage and the second air diffuser pipes 46B in the lower stage. The part in which the solid organics have settled and deposited remains under such conditions that the degradation of the solid organics by facultive bacteria or anaerobic bacteria is always performed.

To more effectively perform the treatment by the treatment system according to the preferred modification of the second embodiment, it is desired, as illustrated in FIG. 5C, to also cause oxygen-containing gas to intermittently diffuse through the second air diffuser pipes 46B arranged in the lower stage inside the treatment tank 40 in the course of the treatment, preferably in the course of treatment under aerobic conditions such that the organically-polluted water in the treatment tank 40 is intermittently placed under agitated conditions 8.

As the specific timing of the above-described treatment by the treatment system according to the preferred modification of the second embodiment, it is preferred to perform the diffusion of oxygen-containing gas through the first and second air diffuser pipes 46A, 46B at the below-described timing, although the timing varies depending on the conditions of organically-polluted water to be treated. When treated in this manner, the liquid and solids in the organically-polluted water remain in the treatment tank 40 for different times as will be described below. Firstly, the diffusion of oxygen-containing gas through the first air diffuser pipes 46A arranged in the upper stage is continuously performed for 5 to 60 minutes, followed by the stoppage of the diffusion for 20 to 240 minutes, and taking this diffusion and its stoppage as a single cycle, this cycle is repeated 3 to 10 times. The total time during the above-described treatment is approximately the residence time of the liquid fraction in the organically-polluted water. In the present invention, energy to be introduced into the treatment tank 40 for organically-polluted water is a little, and the liquid fraction in the organically-polluted water is caused to move in the treatment tank 40 by the energy produced by the intermittent diffusion of oxygen-containing gas. When aeration is performed for 15 minutes by the first air diffuser pipes 46A and non-aeration is then effected for 30 minutes in each treatment tank and this combination of the aeration and non-aeration is repeated 5 times as in the case of the treatment of sewage in a treatment system composed of five treatment tanks connected together in Example 1 to be described subsequently herein, the liquid fraction in the organically-polluted water passes through the treatment tank 40 in approximately (15+30) min ×5 times ×5=1,125 min (18.8 hours).

In the treatment by the treatment system according to the preferred modification of the second embodiment, the diffusion of oxygen-containing gas through the first air diffuser pipes 46A as described above makes it possible to form three types of treatment zones—which include an aerobic treatment zone 1 in an upper part of the tank, where degradation is performed primarily by aerobic bacteria, an anaerobic treatment zone 2 in a lower part of the tank, where degradation is performed primarily by anaerobic bacteria, and a transition zone where degradation is performed primarily by facultive bacteria-within the purification zone of the single treatment tank 40 owing to the above-described construction of the treatment tank 40. The liquid fraction in the organically-polluted water remains in the treatment tank 40 for such a time as described above, during which the liquid fraction is subjected to treatment by aerobic bacteria mainly in the aerobic treatment zone 1.

In the treatment by the treatment system according to the preferred modification of the second embodiment, the diffusion of oxygen-containing gas through the second air diffuser pipes 46B arranged in the lower stage of the treatment tank 40 is also performed to intermittently place the organically-polluted water under the above-described agitated conditions 8 in the treatment tank 40. As a specific timing, it is preferred to perform the diffusion of oxygen-containing gas through the second air diffuser pipes 46B for 5 to 60 minutes at a frequency of once per 5 to 10 times of the diffusion of oxygen-containing gas through the first air diffuser pipes 46A and to repeat the diffusion of oxygen-containing gas through the second air diffuser pipes 46B as many as 5 to 20 times. By the energy of the intermittent diffusion of oxygen-containing gas through the second air diffuser pipes 46B, surface portions of the solids in the organically-polluted water, said surface portions having been liquefied, are caused to migrate into the liquid, and the remaining solid portions are caused to move in the treatment tank 40. It is, therefore, difficult to accurately determine the residence time of the solids in the treatment tank 40. As the solids in organically-polluted water apparently do not move without the diffusion of oxygen-containing gas through the second air diffuser pipes 46B, it is evident that in the treatment system employed in Example 1 to be described subsequently herein and composed of five treatment tanks connected together, the solids remain at least on the order of days in each of the treatment tanks. It is to be noted that the feed rate of the organically-polluted water into the treatment tank 40 can be determined depending primarily on the residence time of above-described liquid and the size of the treatment tank 40.

In the second embodiment and its preferred modification, it is possible to perform treatment such that even with a single treatment tank, the degradations in three types of treatment zones consisting of an aerobic treatment zone, an anaerobic treatment zone and a transition zone at the boundary between the aerobic treatment zone and the anaerobic treatment zone are taken as a combination and this combination is repeated a plurality of times. To perform more prompt treatment, however, 3 to 5 treatment tanks of such a construction as described above can be connected in series preferably.

EXAMPLE 1

Two types of actual organically-polluted waters, that is, sewage (SS: 200 mg/L) and wastewater from a food factory (SS: 1,000 mg/L) were separately treated by feeding them, as were (i.e., in the forms of influents), into a treatment system of the first embodiment or a treatment system composed of five treatment tanks of the preferred modification of the second embodiment connected together. In the case of the sewage, its treatment was performed while feeding it into the respective treatment tanks such that its residence time per unit volume became approximately 19 hours. In the case of the wastewater from the food factory, on the other hand, its treatment was performed while feeding it into the respective treatment tanks such that its residence time per unit volume became 50 hours. Conditions of the individual treatments are shown in Table 1. As also shown in Table 1, it was confirmed that in those actual organically-polluted waters, organics including organic solids were degraded substantially in their entirety into gas and $H_2O$. In particular, no production of sludge took place in any of the treatments. In the case of the sewage, inorganic sludge such as sand remained after the treatments. The inorganic sludge was, however, readily removed by allowing it to settle off. As a result, clear, treated waters free of any suspended substance were successfully obtained as in the case of the wastewater from the food factory.

TABLE 1

| Purification treatment conditions and properties of treated waters in Example 1 | | | |
|---|---|---|---|
| Organically-polluted water (SS [mg/L]) | Treatment system | Details of treatment | Properties of treated water |
| Sewage (SS: 200) | First embodiment | Number of repetitions: 5 times | No production of organic sludge (inorganics remained). Treated water was clear after the inorganics were allowed to settle off. |
|  | Preferred modification of the second embodiment - 5 tanks - | (Residence time of liquid fraction) Pipes 46A: aeration for 15 minutes, followed by non-aeration for 30 minutes. Number of aerations through pipes 46A: 5 times per tank Pipes 46B: aeration for 15 minutes, followed by non-aeration for 8 hours. Number of aerations through pipes 46B: 5 times per tank | No production of organic sludge (inorganics remained). Treated water was clear after the inorganics were allowed to settle off. |
| Wastewater from food factory (SS: 1,000) | First embodiment | Number of repetitions: 10 times | No production of sludge. The treated water was clear although it had slight turbidity. |
|  | Preferred modification of the second embodiment - 5 tanks - | (Residence time of liquid fraction) Pipes 46A: aeration for 40 minutes, followed by non-aeration for 80 minutes. Number of aerations through pipes 46A: 5 times per tank Pipes 46B: aeration for 40 minutes, followed by non-aeration for 10 hours. Number of aerations through pipes 46B: 7 times per tank | No production of sludge. The treated water was clear although it had slight turbidity. |

This application claims the priority of Japanese Patent Application 2005-018917 filed Jan. 26, 2005, which is incorporated herein by reference.

The invention claimed is:

1. A system for the degradation treatment of organics in organically-polluted water, said system being provided with a treatment tank for receiving, as said organically-polluted water, sewage or wastewater, to subject said organics in said organically-polluted water to degradation treatment in said treatment tank, wherein said treatment tank comprises:

an inlet for introducing said organically-polluted water into said treatment tank, an outlet for discharging treated water from said treatment tank, a purification zone arranged between said inlet and said outlet to purify said organically-polluted water while allowing said organically-polluted water to flow there through, and a plurality of perforated walls, each of the perforated walls having at least one plate, each of the perforated walls including a plurality of through-holes formed therein, and arranged with intervals there between in said purification zone to divide said purification zone into plural cells, wherein the plurality of through-holes form openings across 5%-40% of a surface of each perforated wall; said perforated walls are arranged across said flow of said organically-polluted water such that aerobic cells, into which oxygen-containing gas is fed to effect degradation of soluble organics in said organically-polluted water primarily with aerobic bacteria, and anaerobic cells including a pit region formed below a plane that intersects a bottom-most surface of the aerobic cells that the pit region is disposed below the adjacent aerobic cells, in which degradation of solid organics in said organically-polluted water is effected primarily with anaerobic bacteria without feeding oxygen-containing gas, are located adjacent to each other in combinations with said perforated walls interposed there between, respectively, and upon operation of said system, transition zones in which degradation of said organics in said organically-polluted water is effected primarily with facultive bacteria are formed in vicinities of said perforated walls, respectively; and said inlet and said outlet are in communication with a most upstream one and a most downstream one of said aerobic cells, respectively.

2. The system of claim 1, wherein said perforated walls are arranged as many as sufficient to repeat a combination of said degradation with said aerobic bacteria, said degradation with said anaerobic bacteria and said degradation with said facultive bacteria as many as from 3 to 20 times.

3. The system of claim 1, wherein said aerobic cells, said transition zones and said anaerobic cells are arranged in combinations linearly along an influent line of said organically-polluted water.

4. The system of claim 1, wherein said perforated walls are arranged substantially in parallel with each other.

5. The system of claim 1, wherein said anaerobic cells are provided in bottom parts thereof with solids accumulation chambers, respectively, such that solids accumulated in each solids accumulation chamber can be introduced into the immediately downstream aerobic cell as viewed in the direction of an influent line of said organically-polluted water.

6. The system according to claim 1, wherein the perforated walls includes a plurality of plates.

7. The system according to claim 6, wherein each plate within each perforated wall is spaced away from an adjacent wall at an interval from about 10 cm to 50 cm.

8. The system according to claim 1, wherein the through-holes through each plate are from about 3 cm to 10 cm in diameter.

\* \* \* \* \*